United States Patent [19]

Legler

[11] 4,021,212
[45] May 3, 1977

[54] A/C FAN AND FILTER ASSEMBLY
[75] Inventor: William F. Legler, Sugar Grove, Ill.
[73] Assignee: Caterpillar Tractor Co., Peoria, Ill.
[22] Filed: Oct. 16, 1975
[21] Appl. No.: 623,194
[52] U.S. Cl. .................... 55/470; 55/480; 55/484; 55/493; 55/502; 55/504; 55/507; 55/509; 98/40 D
[51] Int. Cl.² ........................ B01D 46/24
[58] Field of Search ......... 55/470, 480, 482, 483, 55/484, 489, 490, 493, 495, 496, 498, 502, 503, 504, 505, 507, 509, DIG. 31, 350, 383; 98/40 D

[56] References Cited
UNITED STATES PATENTS

| 2,640,558 | 6/1953 | Dauphinee | 55/484 |
|---|---|---|---|
| 2,883,056 | 4/1959 | Muller | 55/482 |
| 2,886,124 | 5/1959 | Scharmer | 55/484 |
| 3,423,908 | 1/1969 | Hart | 55/509 |
| 3,507,100 | 4/1970 | Neumann | 55/502 |
| 3,593,503 | 7/1971 | Andrews | 55/509 |
| 3,636,683 | 1/1972 | Francis et al. | 55/493 |
| 3,823,533 | 7/1974 | Alverson et al. | 55/509 |

FOREIGN PATENTS OR APPLICATIONS

| 140,699 | 4/1951 | Australia | 55/493 |

Primary Examiner—Frank W. Lutter
Assistant Examiner—David L. Lacey
Attorney, Agent, or Firm—Phillips, Moore, Weissenberger, Lempio & Majestic

[57] ABSTRACT

A filter mounting assembly for a dual fan airflow system for an air conditioner or the like comprises a pair of spaced-apart fan housings having axially aligned circular inlet openings and a pair of elongated, annular filter elements disposed between the housings and biased by clamping means outward into engagement with annular seating means surrounding the openings in their respective housings.

5 Claims, 3 Drawing Figures

U.S. Patent  May 3, 1977  4,021,212
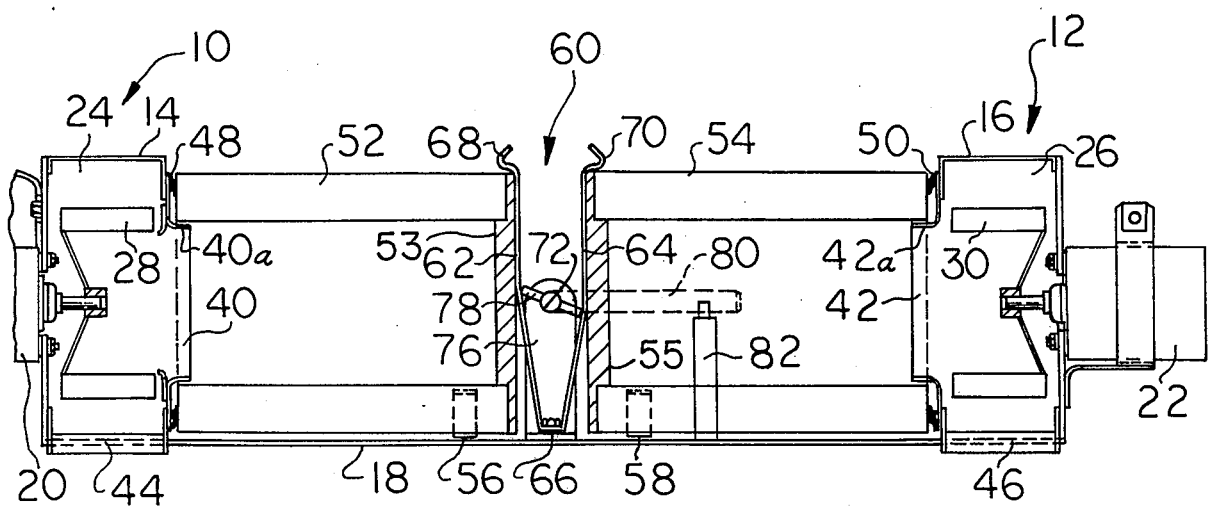
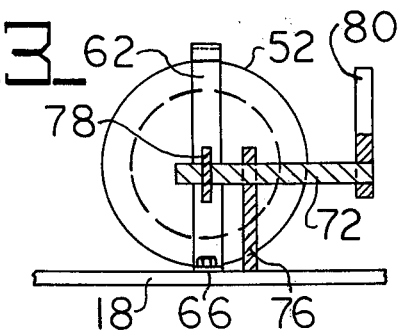
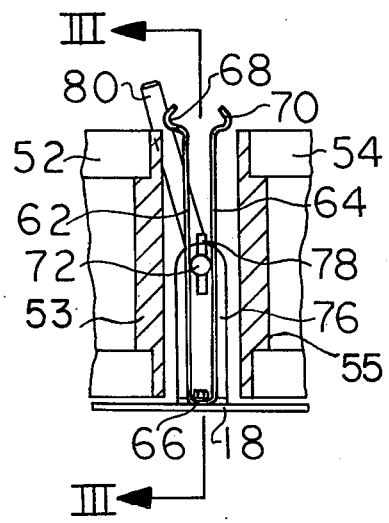

A/C FAN AND FILTER ASSEMBLY

BACKGROUND OF THE INVENTION

Many earth-working and industrial machines have air conditioning or heating systems with an airflow system having filter means. Such systems normally employ filters, filtering the air through the air system. Since space is a premium on such vehicles or machines, the mounting of filters in and on the vehicle becomes a problem.

It is desirable, for example, that the air be filtered when entering the air-flow system. For this reason, the filters must be mounted at the inlet to the airflow system and be large enough to be effective. Such filters must be mounted in such a manner as to be protected from damage, and in a position and manner so as to be effective. It is also desirable that such filters take up as little space as possible and be readily accessible as well as quickly and easily removable and replaceable.

SUMMARY AND OBJECTS OF THE INVENTION

Accordingly, it is an object of the present invention to provide a compact and simple filter-mounting assembly.

Another object of the present invention is to provide a simple and compact mounting assembly for dual filters for a dual flow airflow system.

In accordance with the primary aspect of the present invention, a filter-mounting assembly includes an annular elongated filter element with housing means, having an opening defining a fluid flow path and having annular seat means around the opening with clamping means for clampingly engaging the filter element into engagement with the annular seat means so that air is drawn through the filter element into the inlet means.

BRIEF DESCRIPTION OF THE DRAWINGS

The above and other objects and advantages of the present invention will become apparent from the following description when read in conjunction with the drawings wherein:

FIG. 1 is an elevational view and section of a filter-mounting assembly in accordance with the present invention;

FIG. 2 is a detailed view of a portion of the assembly of FIG. 1 illustrating the clamping mechanism; and, FIG. 3 is a view taken generally along line III—III of FIG. 2.

DETAILED DESCRIPTION OF THE PREFERRED EMBODIMENT

Turning now to FIG. 1, there is illustrated a preferred embodiment of a filter assembly in accordance with the present invention comprising generally a first fan or blower assembly 10 and a second fan or blower assembly 12, each comprising housing means 14 and 16 respectively spaced apart and mounted on suitable means such as a base member 18. Each of the fan assemblies 10 and 12 include motors 20 and 22 each having a shaft extending into a generally cylindrical chamber 24 and 26 of the housings in which is mounted squirrel-cage type radial fan means 28 and 30 respectively.

Each of the housings 14 and 16 include annular means defining circular openings 40 and 42 for inlet means into the chambers 24 and 26 and radial outlet means 44 and 46 for exhaust of air therefrom.

Each of the housing members 14 and 16 are spaced apart with the openings 40 and 42 axially aligned and facing each other. Each of the respective housings 14 and 16 include annular seat means 48 and 50 for sealing and seating a pair of annular elongated filter elements 52 and 54 respectively. The annular elongated filter elements 52 and 54 each include an open end extending into engagement with the respective seating means and a closed opposite end which is closed by suitable end closure platter 53 and 55 engaged by suitable clamping means to be described. Each of the hsouing means includes at its opening, suitable flange means 40A and 42A extending outward therefrom to provide suitable seating or support means for the open end of the filter elements 52 and 54 respectively.

A pair of saddle-type support means or brackets 56 and 58 are suitably spaced outward from each of the respective housings 14 and 16 for supporting the outer end of each of the respective filter elements 52 and 54. Clamping means illustrated generally at 60 is provided for engaging and retaining the closed end of each of the filter elements and retaining them in position against the seats of the housings. The clamping means comprises generally a pair of elongated spring-like numbers 62 and 64 each connected at one end by suitable means such as a bolt 66 or the like to base member 18. The elongated spring members 62 and 64 extend across the closure platter 53 and 55 and the ends of each of the respective filter elements 52 and 54 and include hook-like means 68 and 70 at the outer free end thereof for extending down beyond the end of each of the filter elements along the side thereof for engaging and retaining the filter element into position.

Suitable camming means are provided for camming the respective spring elements into engagement with the ends of the filter elements. This camming means comprises a horizontal shaft 72 rotatably mounted in suitable bracket means 76 which bracket means is secured in a suitable manner such as to base member 18. A suitable camming member such as a pin 78 is mounted on the shaft member 72 and extends outward therefrom with each end thereof engaging a respective one of the spring clamp members 62 and 64. A handle 80 is secured such as to one end of the shaft 72 for rotation of the shaft downward for engagement of the cam means into each of the respective clamp members. The pin 78 defining the cam means, is arranged to have a substantially over center configuration such that the shaft will be retained into its position when rotated downwards by turning handle 80 which then engages suitable stop means formed by an upwardly extending bracket or member 82 in this example of the invention. This over-center is obtained by placing the pin 78 in shaft 72 at an angle to the handle 80 or at least to the horizontal when shaft 72 is rotated to to the lateral position.

Thus, from the above description it is seen that I have provided a simple and effective and compact mounting assembly for a pair of filters for the inlet of an airflow system.

I claim:

1. A dual filter mounting system comprising:
   first and second housing means, each having an annular portion defining a circular inlet opening;
   annular seat means surrounding the inlet opening of each of said housing means for receiving and supporting the end of an annular filter element;

said first and second housing means being spaced apart and having said openings facing toward one another and coaxially aligned a support member connecting said first and second housing means clamping means disposed midway between said first and second housing means and connected to said support member;

first and second annular elongated filter elements, each having an open end and a closed end, said filter elements coaxially disposed between said first and second housing means on opposite sides of said clamping means with said open end of each filter element in engagement with said annular seat of a separate one of said first and second housing means, and said clamping means engaging said closed ends of holding said filter elements in position between said first and second housing means.

2. A filter assembly for an air conditioning system comprising:

at least one fan housing having an opening in one wall for receiving air, at least one annular filter seat means disposed at said wall of said at least one fan housing and encircling said opening for receiving and sealingly engaging an end of an annular filter element, at least one annular first filter element having one end surface disposed against said at least one seat means in coaxial relationship therewith and in sealing engagement therewith, said at least one filter element having an opposite closed end surface remote from said at least one seat means, a support member secured to said at least one housing and extending therefrom along said at least one filter element at least to said opposite end surface thereof, at least one resilient strap having a fixed end secured to said support member and having a free end, said at least one strap having an intermediate portion extending across said opposite end surface of said at least one filter element in proximity thereto, and cam means secured to said support member and positioned for selectively urging said intermediate portion of said at least one strap towards said opposite end surface of said at least one filter element to cause said at least one strap to bend in the direction of said at least one filter element and to exert pressure for holding said at least one filter element against said at least one seat means.

3. The filter assembly of claim 2 wherein said free end of said at least one resilient strap is provided with hook means extending downward along the side of an adjacent portion of said at least one first filter element; and, said cam means comprises a rotatable shaft mounted on said support member and a pin extending radially from said shaft for engaging and for biasing said at least one strap into engagement with said at least one filter element.

4. A filter assembly as defined in claim 2 wherein said at least one fan housing comprises a pair of said fan housings spaced apart on opposite sides of said cam means and being interconnected by said support member, said assembly having a pair of said at least one annular filter elements disposed in spaced-apart coaxial relationship with each filter elements being between said cam means and a separate one of said housings, said assembly further having a pair of said at least one resilient straps each being between said cam means and a separate one of said filter elements, and wherein said cam means simultaneously bears in opposite directions against said intermediate portions of each of said resilient straps enabling each of said filter elements to be secured in place simultaneously by a single movement of said cam means and enabling each of said filter elements to be released simultaneously by a reversed movement of said cam means.

5. A filter mounting assembly as defined in claim 4 wherein said cam means comprises a rotatable shaft mounted on said support member and extending between said pair of resilient straps in a direction substantially normal to that of said straps, pin means extending radially in opposite directions from said shaft to contact said intermediate portions of each of said straps upon rotary motion of said shaft, and means for selectively turning said rotatable shaft about the rotational axis thereof.

* * * * *

UNITED STATES PATENT OFFICE
CERTIFICATE OF CORRECTION

Patent No. 4,021,212   Dated May 3, 1977

Inventor(s) William F. Legler

It is certified that error appears in the above-identified patent and that said Letters Patent are hereby corrected as shown below:

Column 3, line 17 - "of" should read --for--.

Column 4, line 22 - "elements" should read --element--.

Signed and Sealed this

Sixteenth Day of May 1978

[SEAL]

Attest:

RUTH C. MASON
Attesting Officer

LUTRELLE F. PARKER
Acting Commissioner of Patents and Trademarks